US009147324B2

(12) United States Patent
Lin et al.

(10) Patent No.: US 9,147,324 B2
(45) Date of Patent: Sep. 29, 2015

(54) SYSTEM AND METHOD TO DETECT TAMPERING AT ATM MACHINES

(75) Inventors: Yun-Ting Lin, White Plains, NY (US); Tomas Brodsky, Croton on Hudson, NY (US); Mi-Suen Lee, Hales Corners, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1414 days.

(21) Appl. No.: 12/430,657

(22) Filed: Apr. 27, 2009

(65) Prior Publication Data

US 2010/0214413 A1 Aug. 26, 2010

Related U.S. Application Data

(60) Provisional application No. 61/154,577, filed on Feb. 23, 2009.

(51) Int. Cl.
*H04N 7/18* (2006.01)
*G07F 19/00* (2006.01)
*G07G 3/00* (2006.01)

(52) U.S. Cl.
CPC .............. *G07F 19/207* (2013.01); *G07F 19/20* (2013.01); *G07G 3/003* (2013.01)

(58) Field of Classification Search
CPC ..................................................... G06F 19/207
USPC .......................................... 348/150, 153–155
See application file for complete search history.

(56) References Cited

U.S. PATENT DOCUMENTS

| | | | | |
|---|---|---|---|---|
| 5,780,825 | A * | 7/1998 | Sato et al. | 235/379 |
| 7,195,172 | B1 * | 3/2007 | Scarafile et al. | 235/486 |
| 7,403,115 | B2 * | 7/2008 | Yuzik | 340/540 |
| 7,697,026 | B2 * | 4/2010 | Vallone et al. | 348/143 |
| 7,995,791 | B2 * | 8/2011 | Flook et al. | 382/100 |
| 8,132,717 | B2 * | 3/2012 | Smith et al. | 235/379 |
| 8,159,537 | B2 * | 4/2012 | Itoh et al. | 348/155 |
| 8,172,133 | B1 * | 5/2012 | Smith et al. | 235/379 |
| 8,179,439 | B2 * | 5/2012 | Resch et al. | 348/155 |
| 8,189,869 | B2 * | 5/2012 | Bell | 382/103 |
| 2002/0125435 | A1 * | 9/2002 | Cofer et al. | 250/341.1 |
| 2005/0008198 | A1 * | 1/2005 | Guo et al. | 382/115 |
| 2008/0191860 | A1 * | 8/2008 | Flook et al. | 340/506 |
| 2009/0201372 | A1 * | 8/2009 | O'Doherty et al. | 348/150 |
| 2012/0127316 | A1 * | 5/2012 | Kundu et al. | 348/150 |
| 2012/0188377 | A1 * | 7/2012 | Kundu et al. | 348/150 |

OTHER PUBLICATIONS

Active Alert®, Version 4, Administrator's Guide Addendum—Advanced ATM Features, ActivEye®, Inc., Briarcliff Manor, NY U.S. A., Jan. 2007, pp. 1-25.

* cited by examiner

*Primary Examiner* — Douglas Blair
(74) *Attorney, Agent, or Firm* — Husch Blackwell LLP

(57) ABSTRACT

A system and method of detecting tampering at an automatic teller machine includes detecting start and end indicators of a transaction. A representation of a scene at the teller machine, prior to the start of the transaction can be compared to a representation of the scene after the end of the transaction. Variations therebetween can indicate tampering at the machine.

15 Claims, 9 Drawing Sheets

SYSTEM AND METHOD TO DETECT TAMPERING AT ATM MACHINES

CROSS-REFERENCE TO RELATED APPLICATION

This application claims the benefit of the filing date of U.S. Provisional Application Ser. No. 61/154,577 filed Feb. 23, 2009 and entitled "System and Method to Detect Tampering at ATM Machines". The '577 application is incorporated herein by reference.

FIELD

The invention pertains to systems and methods to detect efforts to tamper with an automatic teller machine (ATM). More particularly, the invention pertains to such systems and methods which detect a beginning and an end of a transaction in connection with scene evaluation.

BACKGROUND

One serious problem faced by the banking industry is loss of funds due to fraudulent ATM transactions. One known technique used by the criminal is to install a fake card reader to steal magnetic swipe information of the ATM card, which is sometimes combined with attaching a small wireless camera to the surface of the ATM to steal the matching PIN code. The banking industry suffers tremendous loss due to such fraudulent transactions as often times the lost funds cannot be recovered.

Systems that try to detect general changes in the scene associated with an ATM are known. However, existing video systems that detect changes in the scene at an ATM and generate alerts in response to such changes do not detect specific domain-meaningful markers that annotate human actions. Nor do existing systems use such markers to select the reference scene model for detecting the type of changes required.

DETAILED DESCRIPTION

Figure 1:
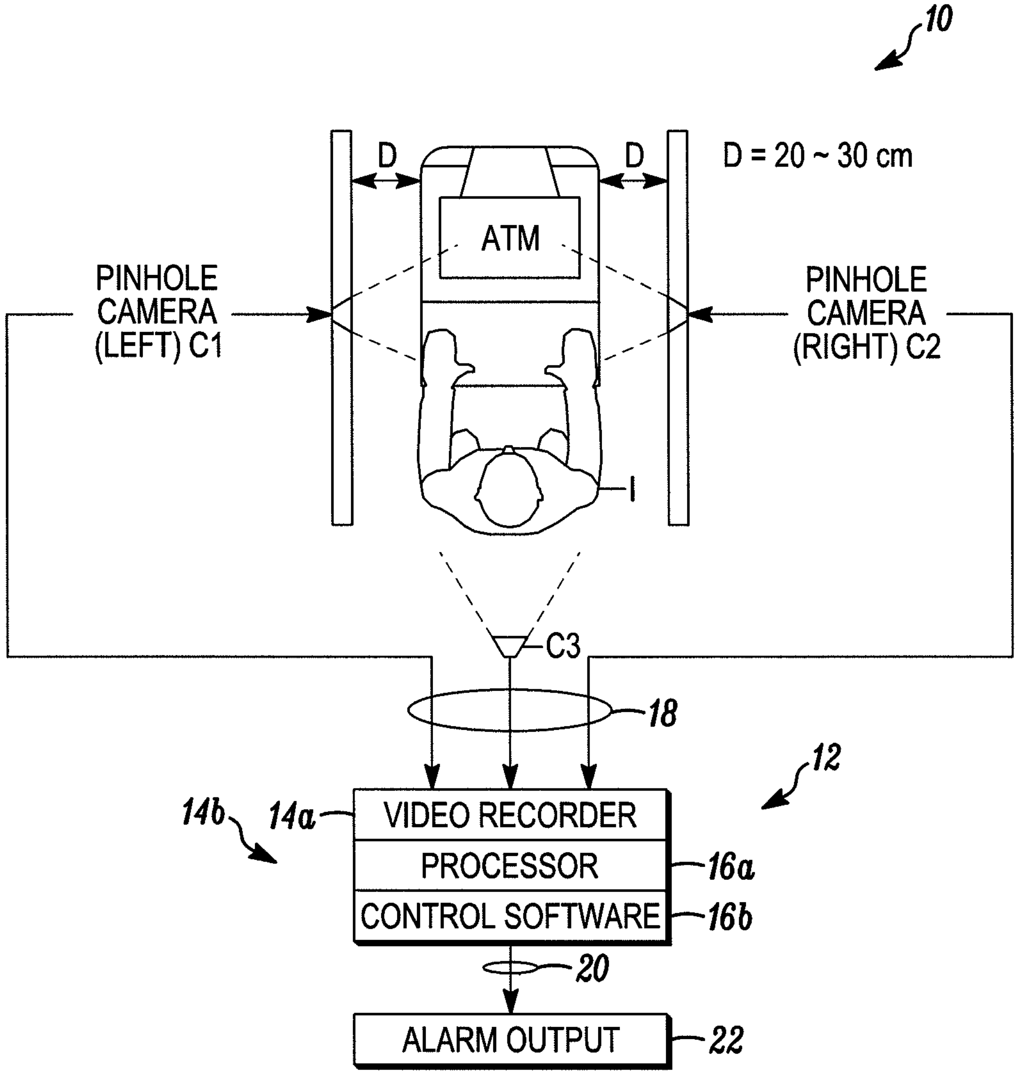
FIG. 1 is a block diagram of an exemplary system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of this invention relate to a system and method for detecting tampering activities at an ATM, for example when a device is attached to the surface of the ATM, or, the surface is altered, to facilitate unauthorized withdrawals from an account.

Methods in accordance with this invention detect if a device has been attached to the surface of the ATM or if any part of the ATM machine has been altered. A device can be a fake card reader that is enclosed on top of the existing one (in order to steal the magnetic card swipe data), a small wireless camera that is attached onto the surface of the ATM (to steal the PIN code information), or alterations of the ATM machine.

One method which embodies the invention incorporates the following advantageous features:

It is video-based, where the image seen by the camera is analyzed in real time. The system continuously learns the appearance of the ATM machine, and detects any actual change made due to object attached to the surface or parts altered on the surface.

The camera is preferably positioned to create a 'profile' view (i.e. from either side of the ATM machine) of the transaction at the close range to allow the field of view (FOV) to include a close-up view of the surface of the ATM as well as the hand movement of the customer. Although this camera view is a preferred embodiment of this invention, the proposed method can be generalized to also use other types of camera views provided that the protected surface is clearly visible and of adequate size in the field of view.

In embodiments of the invention, the beginning and ending of each customer transaction are identified as the customer approaches and leaves the ATM. This allows optimal selection of a reference scene model before the customer transaction starts. This is advantageous because the customer's presence in front of the ATM often changes the visual characteristics of ATM surface as well as the surrounding scene dramatically in the field of view. By being able to reliably mark the transaction period, the system can select one or more reference models, or select the reference model based on timing relative to the transaction markers or how much change in the scene has occurred for reliable detection of meaningful changes to the ATM machine that qualify as tampering action.

In an embodiment of the invention, action markers for beginning and ending of each transaction can be used to control how the scene model is maintained and updated to adapt to the normal changes in the scene. In an aspect of the invention, action markers or domain-specific events can be utilized to either drive the scene model maintenance mechanism or the selection of scene model reference for detecting application-specific types of changes in the scene.

In another aspect of the invention, the beginning of the transaction can be detected by pixel changes in the scene due to shadows from an approaching customer or individual in combination with the presence of the individual in the scene. During the transaction, tampering detection is preferably suspended. Scene learning and adaption can also be suspended during the transaction. The scene learning suspension can also further depend on other scene observations such as how much change in the scene has occurred comparing to the reference model, or the time relation to the transaction or domain-specific markers.

FIG. 1 illustrates an exemplary system 10 which embodies the invention. As illustrated in FIG. 1, at least one camera, such as C1, or two cameras such as C1, C2 can provide a profile view of an ATM prior to the individual I initiating a transaction. When the individual leaves, the transaction has been concluded.

Signals from C1, or C1, 2 are coupled, in this embodiment, to control circuits 12, which can include a video recorder 14*a* and associated processing circuitry 14*b*. Circuitry 14*b* can be implemented, at least in part, by one or more of a digital signal processor or programmable processor, such as used in personal computers indicated at 16*a*, and which might also have associated executable control software 16*b* stored on a computer readable memory device.

An optional booth view camera C3 can also be provided as discussed subsequently relative to FIG. 5. It can be positioned on the ceiling of the ATM booth and pointed towards the ATM machine at a 45-degree angle to cover both the front surface of the ATM and the image of the customer. It will be understood that the invention is not limited by the configuration of the ATM. Walk up and drive through ATM configurations come within the spirit and scope of the invention. The configuration of FIG. 1 is exemplary only.

It will be understood that circuitry 12 might be located at least in part in, or, adjacent to one of the cameras C1, 2, or could be located at a remote or displaced site. Communications between cameras C1, 2 and the circuits 12 can be via a wired or wireless medium 18. The cameras C1, 2 can provide analog, or, digital signals, without limitation, indicative of a two dimensional representation of imagery within a field of view of each, the scene. It will be understood that none of the details of the cameras C1, 2, nor details of the control circuits 12 are limitations of the invention.

The control circuits 12 can learn the scene and build a multiple sample reference representation thereof, based on inputs from cameras C1, or C1, 2 over a period of time before a transaction is initiated. Once a transaction has been initiated, by an individual I the reference representation of the scene can be fixed and updates can be suspended.

After the transaction has been concluded, the scene is then acquired via one or both cameras and compared to the pre-transaction reference representation (for example via a pattern recognition or other comparison process) to detect any evidence of tampering. An alarm 20 can be generated in response to detecting a variation between the pre-transaction representation of the scene and the post-transaction representation. An alarm output device 22 can be located adjacent to the ATM and/or at a displaced monitoring location, or both.

Figure 2:
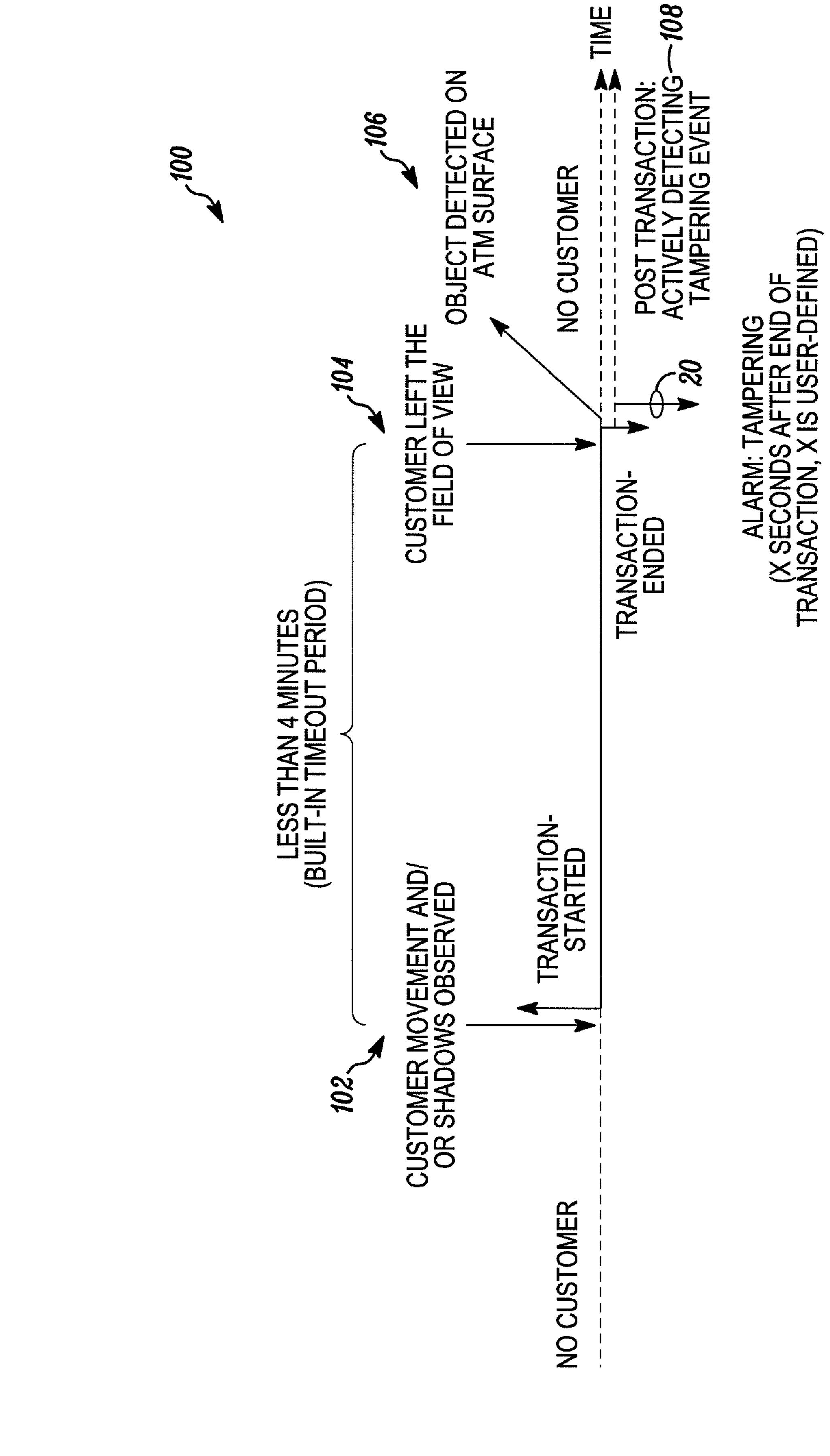
FIG. 2 is a timing diagram illustrating processing for a relatively short transaction.
Figure 3:
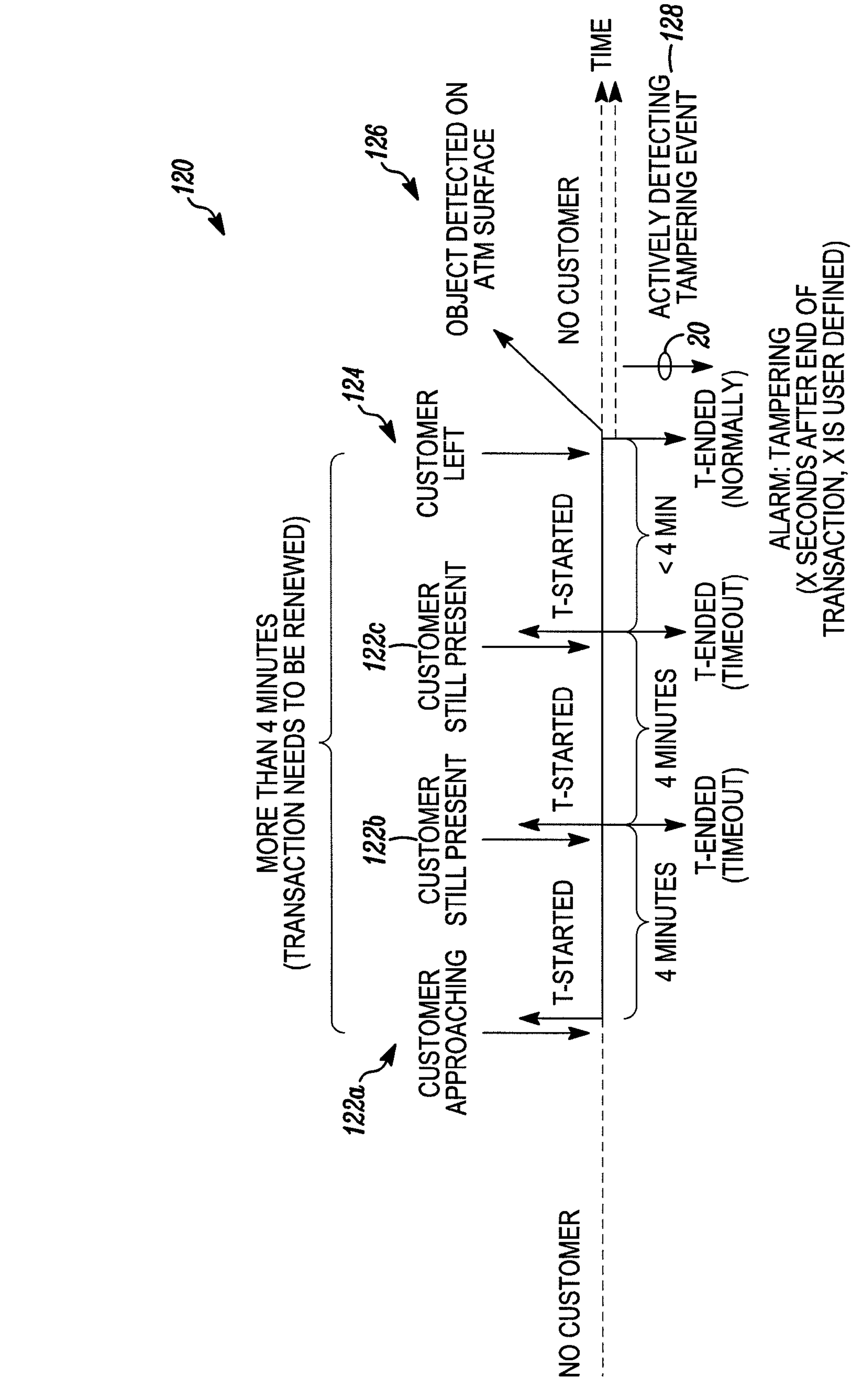
FIG. 3 is a timing diagram illustrating processing for a longer transaction.
Figure 4:
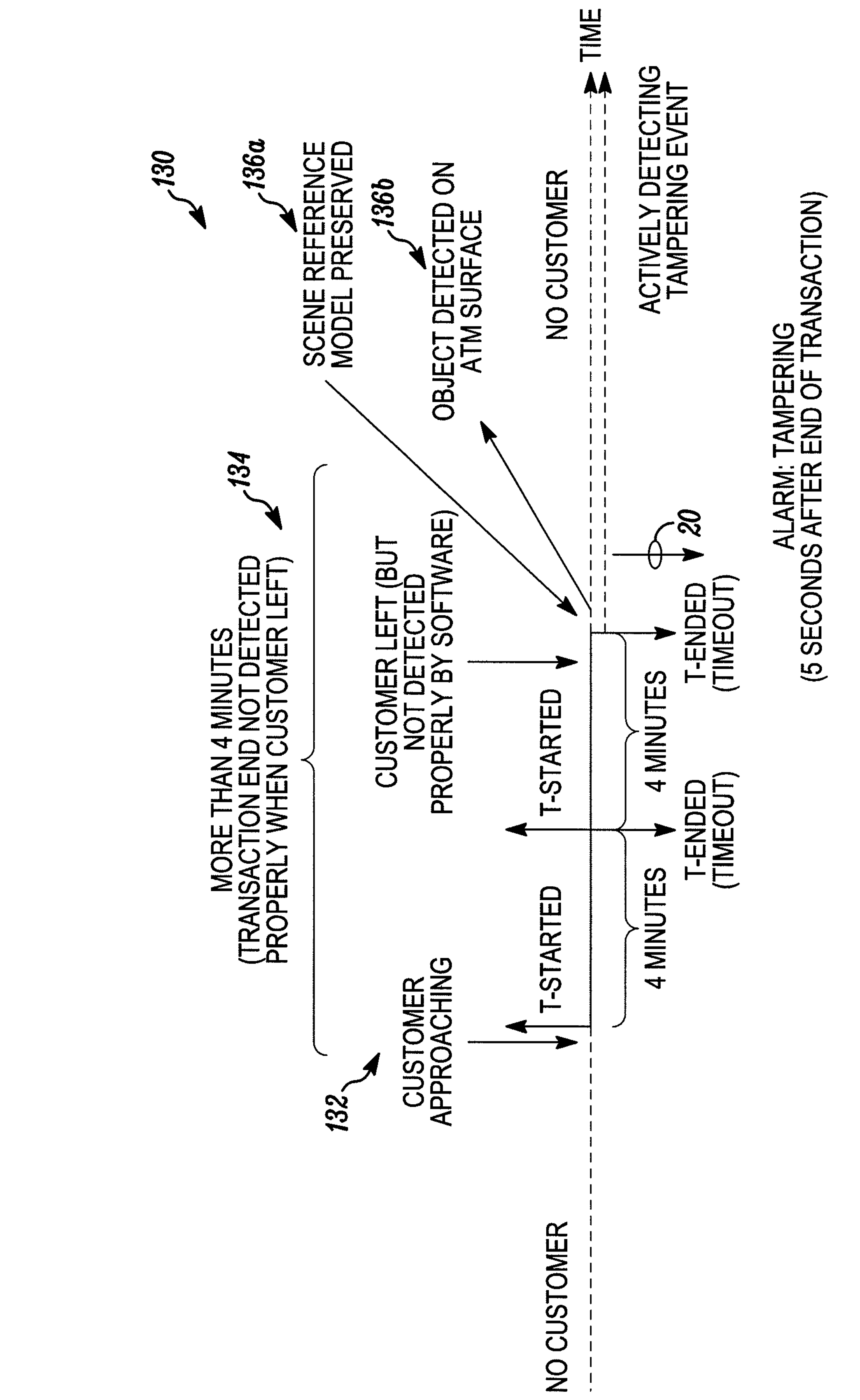
FIG. 4 is a timing diagram illustrating additional aspects of processing for a longer transaction.

FIGS. 2-4 are graphs illustrating various aspects of processing in accordance with the invention. FIG. 2 illustrates processing 100 in connection with detecting a relatively short transaction. Initiation of a transaction, Transaction-started (or T-started), is detected, as at 102, in response to camera C1 or cameras C1,2 and circuitry 12 detecting movement/shadows of a customer, individual I, in the field(s) of view at the ATM.

In response to the customer leaving, as at 104, a Transaction-ended (or T-ended) marker can be established by circuitry 12. Circuitry 12 can then compare the post transaction scene, to the previously established pre-transaction base line representation of the scene, as at 106, to determine if an unknown object has appeared in the post transaction scene. In response thereto, where such an object has been detected, a tampering event can be signaled, as at 108 via an alarm 20.

FIG. 3 illustrates time based processing 120 where the transaction extends for a longer time interval than a built-in transaction timeout period, for example four minutes as in FIG. 2. As illustrated in FIG. 3, the active transaction state, initiated as at 122*a*, can be restarted multiple times at the end of each timeout as long as the customer is still present, as at 122*b*, and 122*c* until circuitry 12 makes a determination that the customer, individual I has departed, as at 124. In response to a T-ended determination then the circuitry 12 carries out the scene comparison process as described above. Where an unknown object has been detected, as at 126. A tampering event alarm 20 can be raised, as at 128.

FIG. 4 illustrates aspects of processing 130 where departure of the customer, individual I, was not properly detected. Once the customer approaches, as at 132 and has been detected, a T-started marker can be generated by circuitry 12. Where the transaction appears to exceed four minutes, another T-start marker can be generated. In the event the customer, individual I leaves and that departure is not properly detected as at 134, the T-ended marker will be generated by circuitry 12 in response to a time out.

Circuitry 12 can then evaluate the quality of the base line representation of the scene and if found to be defective can reset it as at 136*a*. Alternately, where that representation does not appear to be defective, a comparison can be made, as described above to determine if an unknown objected(s) is/are present in the field of view as at 136*b*. Where the object(s) has been detected, the alarm 20 can be generated.

Figure 5:
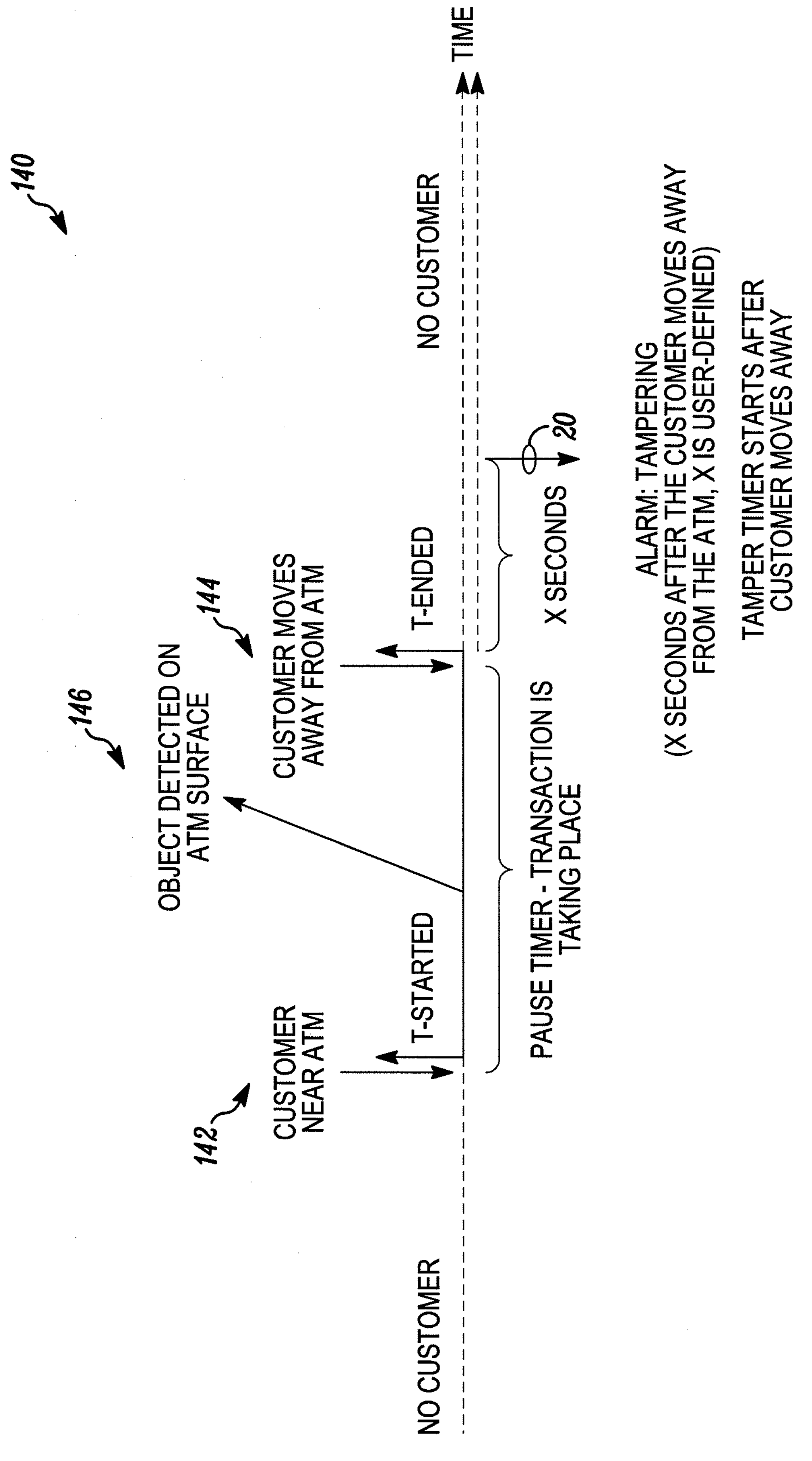
FIG. 5 is a timing diagram illustrating booth view processing.

FIG. 5 illustrates processing 140 associated with optional camera C3. Quality of detection of transactions can be enhanced by pause timer accumulation when a person is "near" the ATM, which is an equivalent of an ongoing transaction. An individual can be considered "near" the ATM where that individual's image, shadow or reflection overlaps or blocks the ATM surface.

Between when a customer, or individual I, has moved near the ATM and been detected by camera C3, as at 142 and then moved away from the ATM as at 144, circuits 12, via camera C3 can establish that an object has been detected on the ATM surface as at 146. Scene changes received from the camera C3 can be used to exclude changes in the base line model or representation based on input from cameras C1, 2. A tamper indicating alarm 20 can be generated subsequent to a selectable time interval in response to the person moving away from the ATM.

Figure 6:
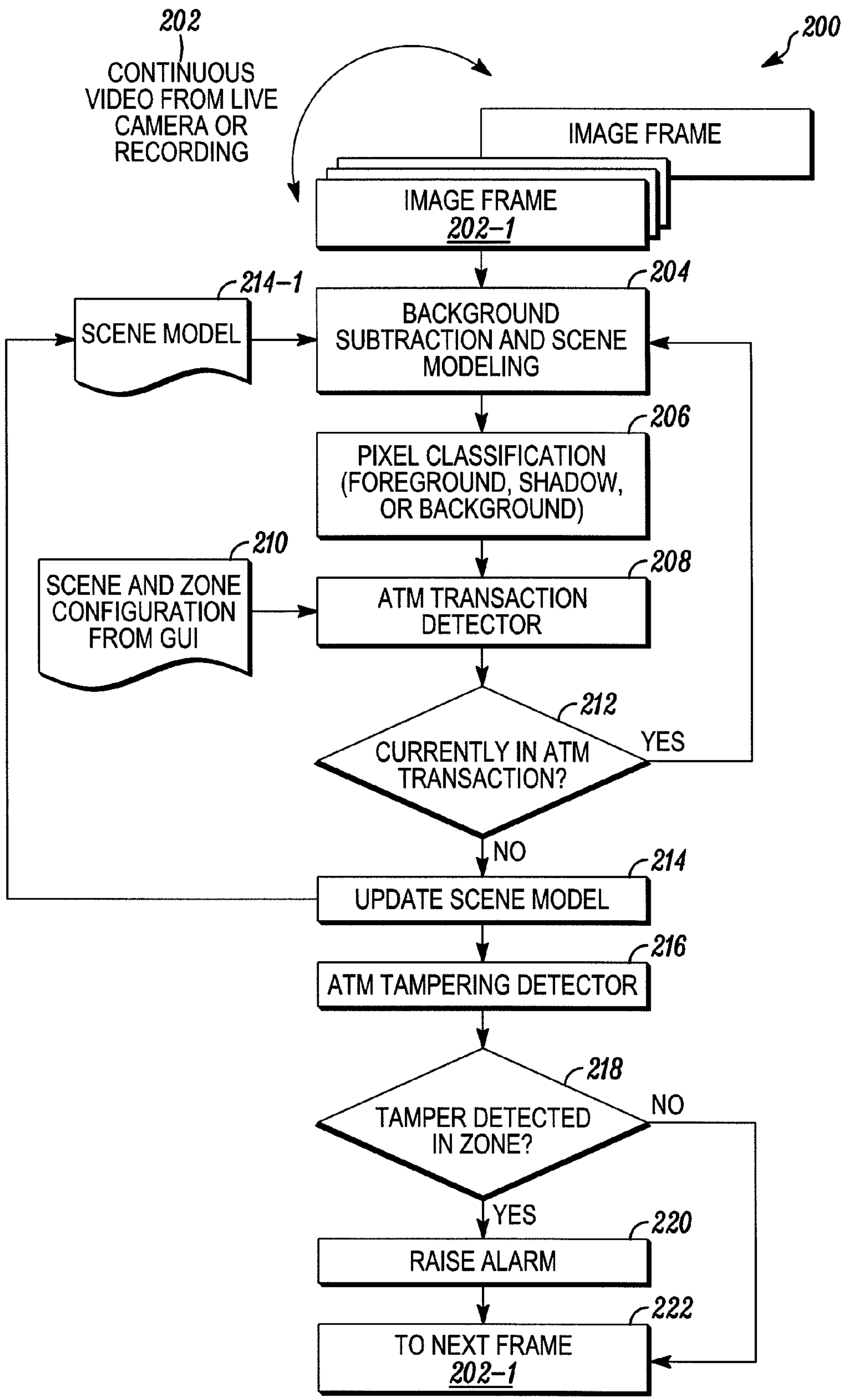
FIG. 6 is a flow diagram of a method which embodies the invention.

FIG. 6 illustrates overall flow of a process 200 of detecting tampering at an ATM which embodies the present invention. Image frames from continuous live or pre-recorded analog or digital video signals are being processed in real-time, as at 202. The system maintains a scene model (or sometimes called background model) on a continuous basis. Each new image frame is compared with the background model, and by subtracting the background, the change in the current image frame is detected, as 204. The pixels in the changed image (after background subtraction) are classified into foreground, shadow or background, as at 206. By analyzing the location and distribution of the changed pixels and the ratio between changed and unchanged pixels, combined with the configuration setting by the user, as at 210 (e.g. camera view point, where to detect tamper event, etc.), the transaction detector determines whether there is an ongoing ATM transaction when a customer is actively using the ATM machine to withdraw or deposit cash, check account balances and so on, as at 208. The transaction detector marks the starting point and the end of a customer transaction by analyzing the changes in the image on a continuous basis.

If currently there is a transaction in process (i.e. in transaction), the control 12 continues to analyze the next change image until the transaction detector determines that the transaction has ended (i.e. out of transaction). In such case, the tampering detector becomes active, as at 216 and it looks for changes inside the user-defined area that typically covers the surface of the ATM machine, as at 218 and raises an alarm in the video surveillance system, as at 220 if a change to the ATM surface is detected.

The markers of transaction start and end also control the timing of updating (i.e. learning or adapting) of the scene model, as at 214. Only when the ATM machine is not engaged in a transaction will the scene model 214-1 be updated for the system to learn about the natural changes in the video (when there is no customer using the ATM). This ensures the qualify of the scene model so that after applying background subtraction method the changed image reflects changes due to customer traffic or other actual changes in the scene.

Figure 7:
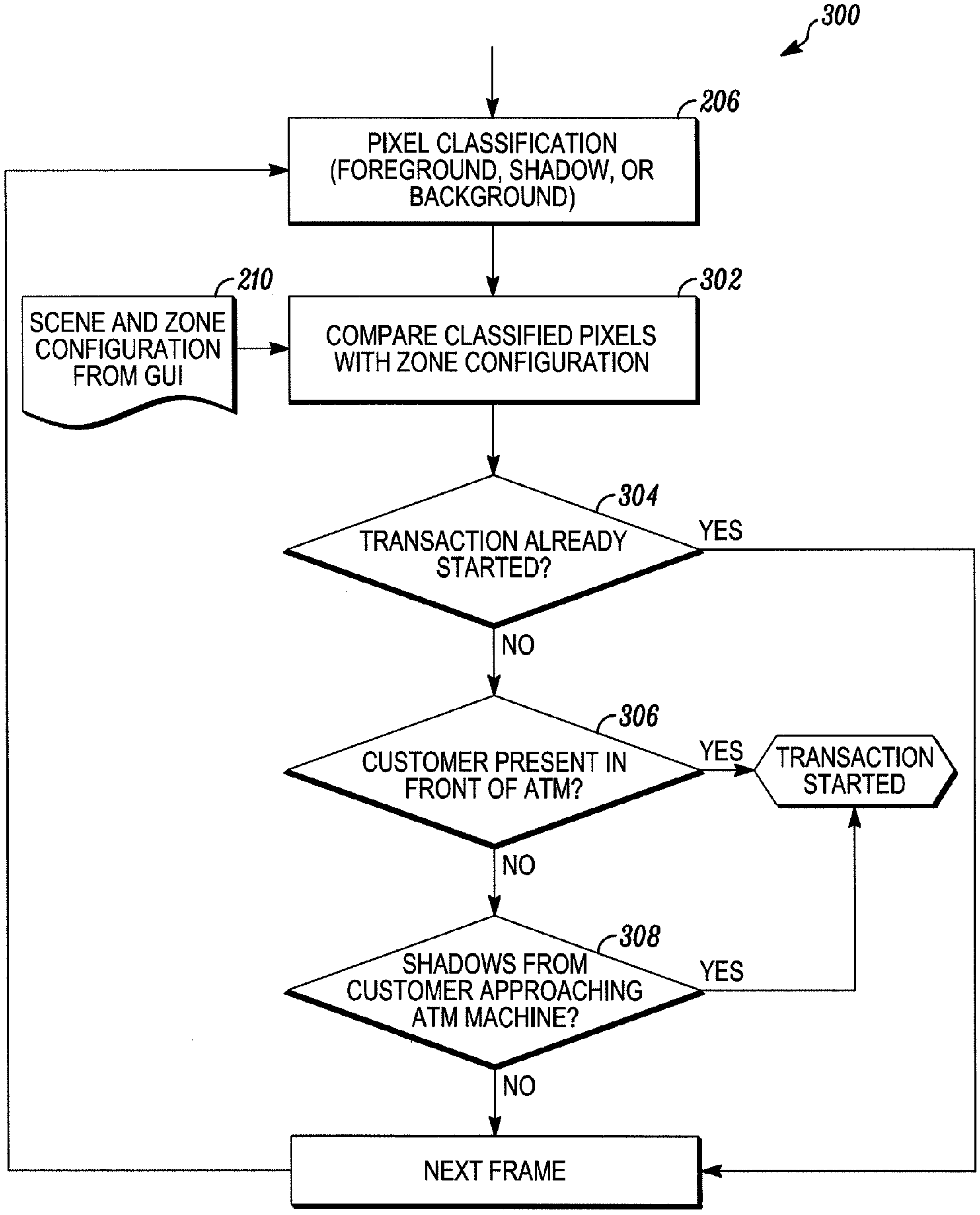
FIG. 7 is a flow diagram illustrating detecting the start of a transaction.
Figure 8:
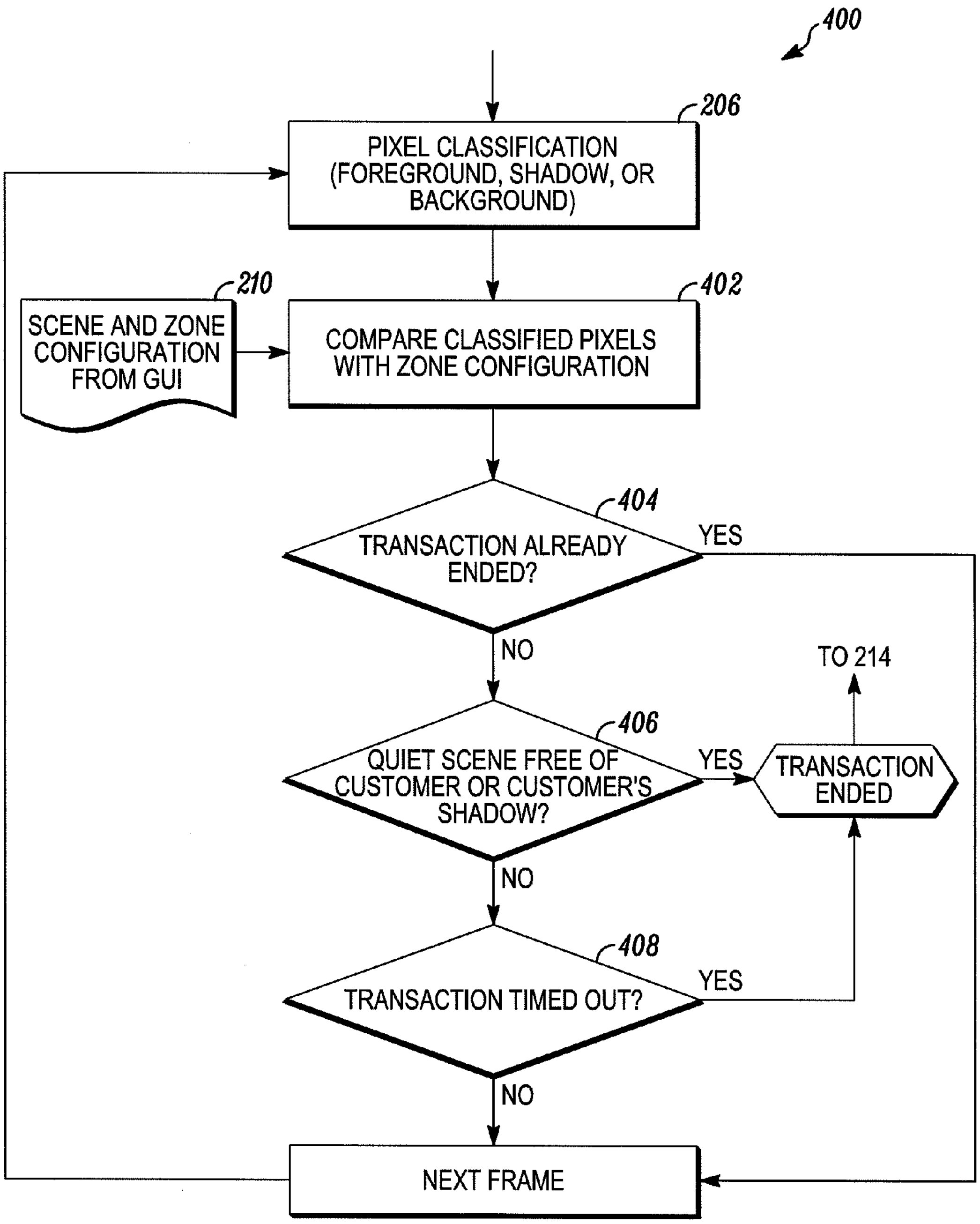
FIG. 8 is a flow diagram illustrating detecting the end of a transaction.

Transaction detection processing 300, 400, illustrated in FIGS. 7, 8 determines whether or not a customer is currently, actively using an ATM. The processing of FIGS. 7, 8 utilizes the classified pixels in the changed image after background subtraction, as at 302, 402. It also considers the input from the user through user configuration of the system, where the user can specify the type of scene such as the camera view point (e.g. side or profile view of the ATM, or a regular view that covers the room with ATM machine) and the various zones to look for alteration or change to the ATM surface, as at 210.

Transaction detection processing, FIG. 7 looks for either the customer's presence in the scene (foreground pixels from body parts seen near the boundary of the video) or merely shadow or reflection of the customer, as at 306, 308. The transaction detection processing FIGS. 7, 8 analyzes the characteristics of the pixels or scene features in the changed image in order mark the start or end of a transaction. Such characteristics include the location, distribution of these changed pixels or scene features, their relation to the user configured zones for tampering detection, the ratio between changed and unchanged pixels or scene features, and the temporal changes of various types of pixels or scene features.

To prevent the transaction detection processing from making mistakes or not detecting the end of the transaction properly (and therefore disabling the ATM tampering detector for prolonged period of time), a built-in timeout period, as at 408 can be provided to force a transaction to end if it exceeds that timeout limit. After the forced transaction end, if the customer is still present, the changed image will contain a partial view of the customer or the shadow/reflection of the customer and detect another start of a transaction again, to renew the transaction and continue to suspend the tampering detection.

Figure 9:
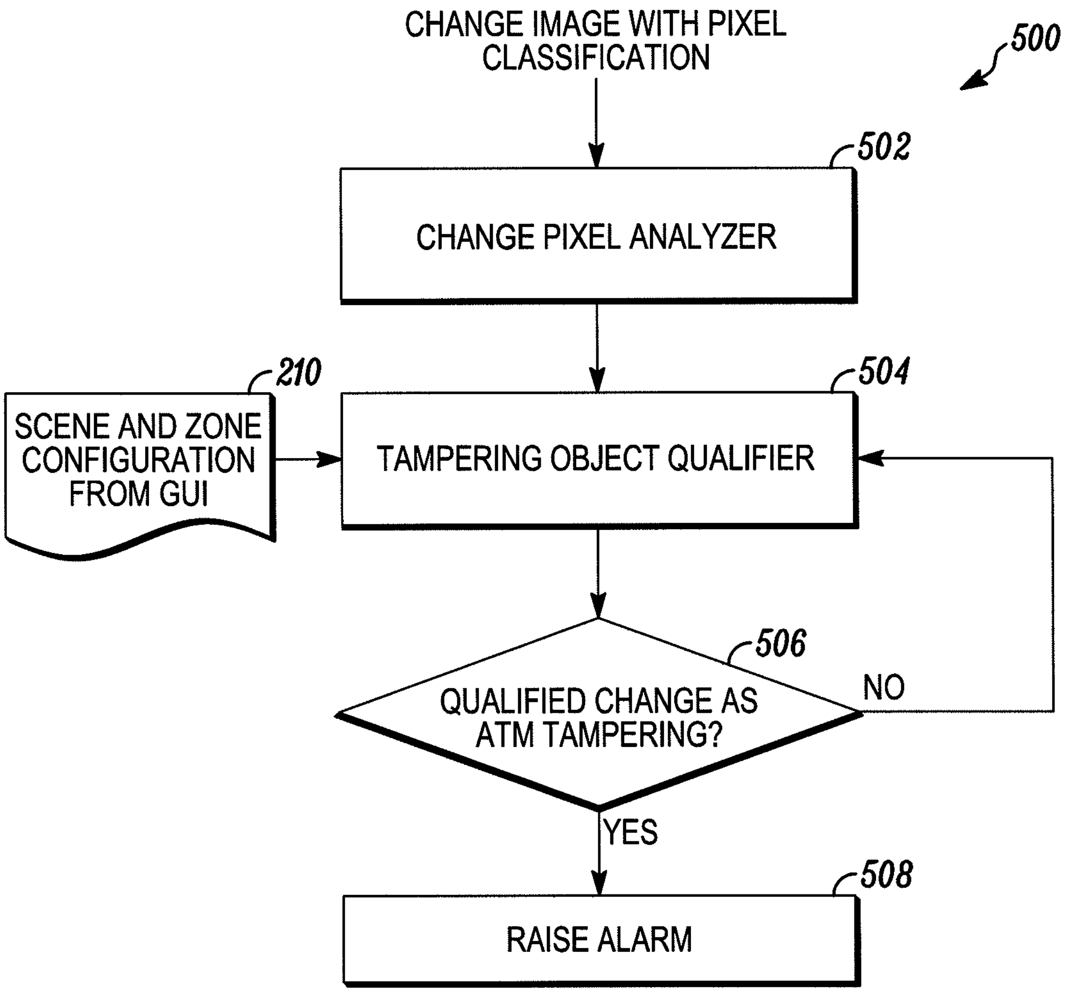
FIG. 9 is a flow diagram illustrating exemplary processing to detect tampering in accordance with the invention.

As illustrated in FIG. 9, relative to processing 500, when the ATM is not in a transaction, the tampering detection processing is active and it continuously compares the current image with the scene model to detect changed pixels to see if the surface of the ATM machine has been altered.

In the disclosed embodiment, not all changed pixels will lead to an alarm, as there are many factors that may cause the pixel value to change, including lighting change in the scene, camera noise or auto-gain, reflection from other scene objects, appearance of an actual physical object. To detect ATM tampering event, only the change from an actual physical object attached to the ATM machine is of interest.

In a preferred embodiment, a change pixel analyzer, as at 502 keeps track of the all the changed pixels frame by frame on a continuous basis over time. The tampering object qualifier, as of 504, selects clusters of changed pixels with characteristics or features that match well with changes caused by real physical object attached to the surface of the ATM. These clusters of changed pixels become qualified for generating ATM tampering event, as at 506 and raise an alarm, as at 508.

Those of skill in the art will recognize that the processing of FIGS. 6-9 can be implemented with hardwired logic circuits, or preferably with one or more programmable processors in conjunction with executable software, pre-stored on a computer readable storage medium. All such variations come within the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:

at least one multi-dimensional optical sensing element with a predetermined field of view;

control circuits coupled to the sensing element; and a storage unit coupled to the control circuits, wherein the control circuits obtain a background model of the field of view from the sensing element and store the background model in the storage unit, wherein the control circuits obtain a current image of the field of view from the sensing element and compare the current image with the background model in the storage unit, wherein, responsive to comparing the current image with the background model, the control circuits determine whether a transaction has been initiated, wherein, when the control circuits determine that the transaction has not been initiated, the control circuits update the background model in the storage unit with the current image, wherein, when the control circuits determine that the transaction has been initiated, the control circuits obtain a new current image of the field of view from the sensing element and compare the new current image with the background model in the storage unit, wherein, responsive to comparing the new current image with the background model or responsive to an indication that a predetermined timeout period has elapsed without being reset, the control circuits determine when the transaction has ended, wherein responsive to the determination that the transaction has ended, the control circuits determine whether the new current image includes evidence of tampering, wherein, when the control circuits determine that the transaction has ended and tampering is not detected, the control circuits update the background model in the storage unit with the new current image; and wherein the control circuits continuously update the background model when the control circuits are not engaged in a transaction.

2. An apparatus as in claim 1 where the control circuits compare a post transaction representation of the field of view to a pre-transaction representation of the field of view.

3. An apparatus as in claim 2 where the control circuits, in response to a selected variation between the post transaction representation and the pre-transaction representation of the field of view, generate a tamper alarm indicator.

4. An apparatus as in claim 1 where, between transaction initiating and transaction ending signals, the background model is fixed.

5. An apparatus as in claim 1 which includes first and second optical sensing elements with different fields of view.

6. An apparatus as in claim 5 where the orientation of the fields of view is at one of substantially forty-five degrees or ninety degrees to one another, or substantially one hundred eighty degrees to one another.

7. An apparatus as in claim 5 where the sensing elements have fields of view directed toward one another.

8. A method comprising:

sensing a predetermined multi-dimensional scene to obtain a background model of the scene;

storing the background model in a storage unit;

sensing the scene to obtain a current image of the scene;

comparing the current image with the background model in the storage unit; responsive to comparing the current image with the background model, determining whether a transaction has started;

when the transaction has not started, updating the background model in the storage unit with the current image;

when the transaction has started, sensing the scene to obtain a new current image of the scene;

comparing the new current image with the background model in the storage unit;

responsive to comparing the new current image with the background model or responsive to an indication that a predetermined timeout period has elapsed without being reset, determining when the transaction has ended;

responsive to determining the transaction has ended, determining whether the new current image includes evidence of tampering, and when the transaction has ended and there is no evidence of tampering, updating the background model in the storage unit with the new current image; and wherein the control circuits continuously updates the background model when the control circuits are not engaged in a transaction.

9. A method as in claim 8 which includes, when the transaction has not started or when the transaction has ended, determining if differences between the background model and the current image or the new current image indicate a tamper event, and responsive thereto, generating a tamper indicating alarm.

10. A method as in claim 1 where sensing includes collecting a plurality of sensed scenes over a period of time.

11. A method as in claim 10 which includes storing members of the plurality of sensed scenes.

12. A method as in claim 11 where building the background model takes place in response to one of, stored members of the plurality, or real-time streaming video signals.

13. A method as in claim 12 where comparing includes at least one of pattern recognition, neural net processing, feature extraction and comparison, or, pixel level processing using both spatial and temporal information of the detected changes.

14. A transaction detector comprising:

first and second optical sensors, each sensor has a selected field of view; circuitry coupled to the sensors; and a storage device coupled to the circuitry, wherein the circuitry obtains a background model of the fields of view from the sensors and stores the background model in the storage unit, wherein the circuitry obtains a current image of the fields of view from the sensors and compares the current image with the background model in the storage unit, wherein, responsive to comparing the current image with the background model, the circuitry determines whether an individual is moving, at least in part, in at least one of the fields of view, wherein, when the circuitry determines that the individual is not moving in at least one of the fields of view, the circuitry updates the background model in the storage unit with the current image, wherein, when the circuitry determines that the individual is moving in at least one of the fields of view, the circuitry obtains a new current image of the fields of view from the sensors and compares the new current image with the background model in the storage unit, wherein, responsive to comparing the new current image with the background model or responsive to an indication that a predetermined timeout period has elapsed without being reset, the circuitry determines when the individual has departed from the fields of view, wherein, responsive to determining that the individual has departed, the circuitry determines whether the new current image provides evidence of tampering, and wherein, when the circuitry determines that the individual has departed from the fields of view and there is no evidence of tampering, the circuitry updates the background model in the storage unit with the new current image; and wherein the circuitry continuously updates the background model when the individual is not moving in at least one of the fields of view.

15. A detector as in claim 14 where the circuitry compares a post transaction representation of the fields of view to a pre-transaction representation of the fields of view.

* * * * *